May 1, 1923.
J. GOOD
ENGINE PREHEATER
Original Filed Oct. 29, 1917
1,453,669
Fig. 1,
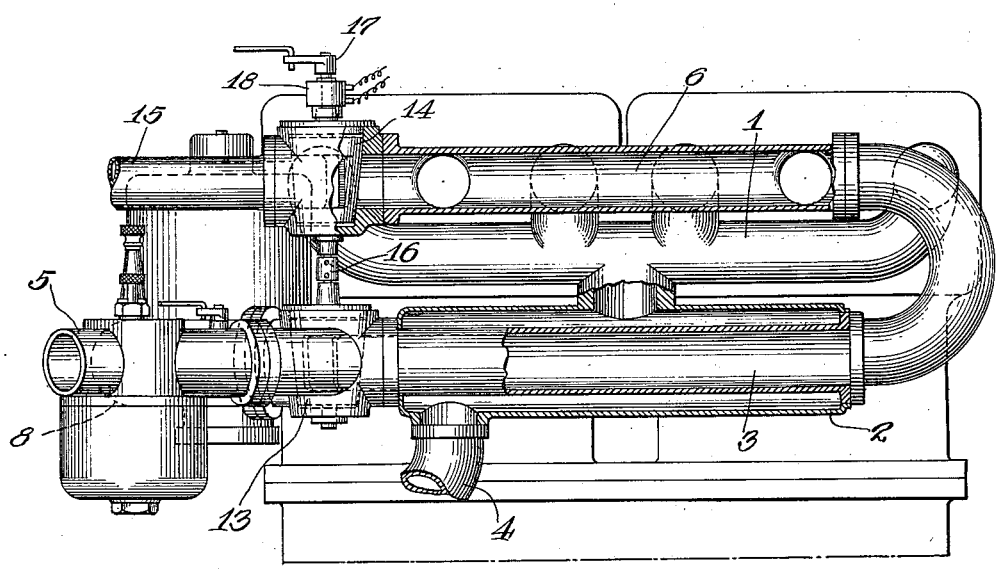
Fig. 2,
Fig. 3,
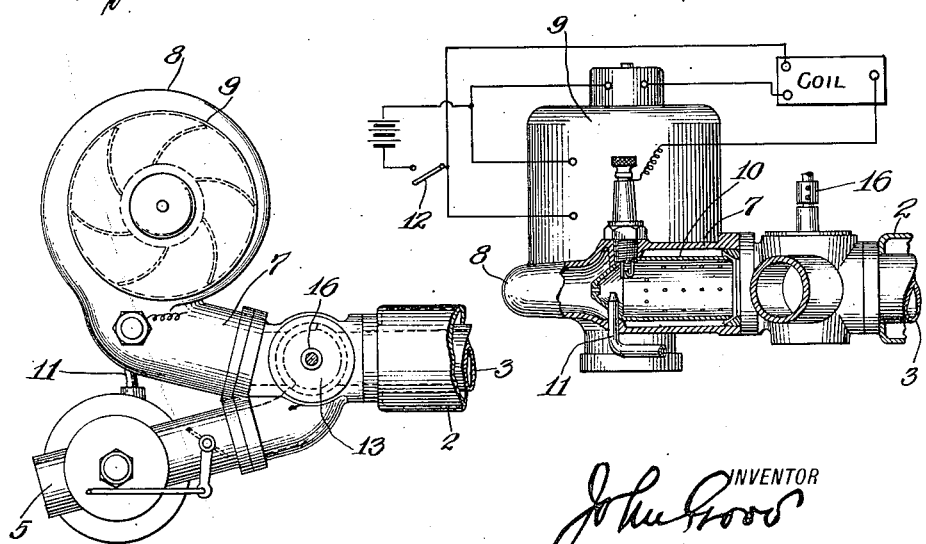
INVENTOR
John Good
BY
ATTORNEY Patented May 1, 1923.

1,453,669

UNITED STATES PATENT OFFICE.

JOHN GOOD, OF GARDEN CITY, NEW YORK, ASSIGNOR TO GOOD INVENTIONS CO., OF BROOKLYN, NEW YORK, A CORPORATION OF NEW YORK.

ENGINE PREHEATER.

Application filed October 29, 1917, Serial No. 199,012. Renewed September 29, 1922. Serial No. 591,412.

*To all whom it may concern:*

Be it known that I, JOHN GOOD, citizen of the United States, residing in Garden City, Long Island, N. Y., have invented the following described Improvements in Engine Preheaters.

The invention consists in a simple and quick means of applying a heating medium to internal combustion engines for producing a working temperature therein to enable them to start in action.

Fig. 1 illustrates a preferred form of the invention partly in section and as applied to an engine of conventional form;

Fig. 2 is a top plan of the carburetor and source of heating medium; and

Fig. 3 is a detail illustrating the preferred source of heat.

The engine illustrated may be taken as representative of any type of combustion engine requiring the application of heat for perfecting its charge mixture for vaporizing its fuel, and for this purpose it is shown with its exhaust manifold 1 delivering to a chamber 2 in heat-transferring relation to a part of the engine intake passage 3. From the chamber 2 the exhaust escapes through exhaust pipe 4. The charge mixture of air and fuel for the engine is proportioned by a carburetor 5 conventionally illustrated, and is drawn therefrom through the intake passage 3 into the intake manifold 6 and thence into the combustion space or spaces of the engine.

In the working condition, the exhaust gas heats the passage 3 sufficiently to vaporize the liquid fuel in transit therethrough and produce the proper gaseous mixture, but when such an engine is cold, a preliminary source of heat is required in order to prepare it to start its normal action. According to this invention the preliminary heating is done by temporarily passing a heated or heating medium through a part or the whole of the intake passage until its walls, or parts within it, have stored up enough heat to vaporize the first few charges from the carburetor. Whereupon the flow of the heating medium is stopped and the flow from the carburetor is allowed to begin, resulting in the formation of a hot, vaporous mixture adapted to keep the engine firing until it furnishes its own heat for continued operation. This method of heating the intake passage from the inside has various advantages over exterior heating, particularly in respect to the time involved and the absence of complication in the structure of the exhaust line, both of which matters are of great importance to engines for automotive uses.

The object is readily accomplished by providing the intake passage with suitable connections which will serve to interpose the said passage, either in the path of flow of the heating medium or in the path of flow of the carburetted mixture and various methods of connections and designs of valve mechanism may be available for the purpose. The heating medium in the present case is flame or combustion products and is supplied under a moderate pressure from a motor-driven burner-head 7 constructed and operating according to the principles disclosed for example in my co-pending application Serial No. 195,506. Briefly this burner device consists of a source of fluid pressure represented by a fan 8 driven by a small electric motor 9 and delivering air to a perforated distributing shell 10 in such way as to induce or aspirate a flow of liquid fuel from the nozzle 11, this fuel being more or less mixed with air inside the shell is ignited by the spark plug therein. The nozzle 11 is supplied with fuel from the constant-level receptacle of the carburetor 5 and the spark plug is connected, through a coil, in the motor circuit so that ignition and combustion takes place instantly on the closing of a single switch such as 12.

The connection of this flame source to the engine is made by valve mechanism which as shown is duplex, comprising two rotary, plug-type valve members, one controlling one end and the other the other end of the intake passage. The one, 13, at the entrance end of the passage serves to connect it with the carburetor or burner-head and when open to one is closed to the other. The valve 14 at the engine end of the intake passage merely opens and closes an outlet to atmosphere represented in the drawings as consisting of an exhaust or escape pipe 15. When this outlet valve is open the burner-head is connected to the intake passage and a free path is thus provided for the flame from the latter. The burner-head shown is adapted to deliver a strong forced current of flame through the intake passage, heating it rapidly to a high temperature.

The structure of the burner-head forms no part of this invention and it is to be regarded merely as indicative of a suitable source of heat. Preferably the two ends of the intake passage are so designed as to be near each other so that the two valve members can be located together and hence conveniently connected for simultaneous operation. They are shown herein as in axial alignment and connected by a coupling 16 so that by the operation of a single handle or crank such as 17 on one of the valves they may both be set to whichever position is desired, that is to say, either to connect the intake pipe to the carburetor and close off the burner connection and also close off the escape outlet 15 or else to connect it to the burner-head and open said escape while closing off the carburetor connection. The same handle, or valve-operating means, may carry a switch 18 performing the same function as the switch 12 diagrammatically shown in Fig. 3, so that the mere manipulation of the handle to one position will automatically stop or start the burner and thereby control the flow of the heating medium and the relation of the intake passage as above described. It will be observed that the location or character of the flame or heating connection is not of particular consequence so long as a sufficient part of the intake passage is subjected to the heating agent and the intake thereafter properly restored to normal function. It will be recognized that this effect can be obtained with a variety of forms of structure and relative arrangements of burner head and intake passage, all of which will involve some controlling means whereby the heating medium can be temporarily blown through the whole or a part of the intake line to prepare it for the working condition. It will also be obvious that the section of the intake within the exhaust chamber 2 constitutes a vaporizer tube and in that respect is representative of any other suitable type of exhaust heat vaporizer mechanism.

Claims.

1. The combination in an engine, of means for introducing fuel and air for internal combustion therein including an intake passage, and independent means including a source of fluid pressure for non-explosively burning liquid fuel in said passage.

2. The combination in an engine, of means for introducing fuel and air for internal combustion therein including an intake passage and a burner independent of said means including a source of pressure and having a connection to deliver flame or combustion products into said passage.

3. The combination with the intake passage of an internal combustion engine of a fluid pressure combustion device having communication therewith and adapted to deliver flame or combustion products through said communication and means for preventing flow through said communication when the combustion device is not operating.

4. The combination with the intake passage of an internal combustion engine, of a fluid-pressure-operated combustion device in communication therewith and means for closing the communication when the passage serves its normal intake function.

5. The combination with an internal combustion engine, of means independent of its normal fuel supply connections for internally heating the engine, a communication between said engine and means and a valve member controlling flow through said communication and correlated to said heating means for conjoint operation by the operator.

6. The combination with an internal combustion engine having a passage leading to its intake port or ports a flame inlet in said passage, a flame source connected thereto and an exhaust outlet from said passage, separate from said intake ports.

7. In an internal combustion engine having a carburetor and a source of heated medium independent of the combustion in the engine, valve mechanism adapted to interpose a part of the engine intake passage alternately in the path of flow from the carburetor to the engine or from said source to a suitable outlet, other than the outlet of said passage to the engine.

8. In an internal combustion engine, the combination of the engine intake and an enclosed, forced-draft, combustion apparatus operating to blow flame through said intake for preheating the same and means for isolating said apparatus from the intake during the normal functioning of the latter.

9. In an internal combustion engine, the combination of the engine intake, an enclosed, forced-draft, combustion apparatus adapted for connection to the intake to blow flame therethrough, a spark plug in said apparatus, an electric motor for operating said apparatus, and a single current source for operating both plug and motor.

In testimony whereof, I have signed this specification.

JOHN GOOD.